(12) United States Patent
Wang et al.

(10) Patent No.: US 9,646,231 B2
(45) Date of Patent: May 9, 2017

(54) CASING AND ELECTRONIC DEVICE USING THE SAME

(71) Applicant: HTC Corporation, Taoyuan (TW)

(72) Inventors: Chi-Jer Wang, Taoyuan (TW); Chien-Hung Chen, Taoyuan (TW); Kuan-Ku Kuo, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 110 days.

(21) Appl. No.: 14/640,605

(22) Filed: Mar. 6, 2015

(65) Prior Publication Data

US 2016/0262276 A1 Sep. 8, 2016

(51) Int. Cl.
*G06F 1/16* (2006.01)
*G06K 13/00* (2006.01)
*G06F 1/18* (2006.01)

(52) U.S. Cl.
CPC ............. *G06K 13/00* (2013.01); *G06F 1/18* (2013.01)

(58) Field of Classification Search
CPC ... H05K 5/0239; H05K 5/0286; H05K 5/0295
See application file for complete search history.

(56) References Cited

U.S. PATENT DOCUMENTS

| 7,837,092 | B2 * | 11/2010 | Wen | G06K 13/08 235/375 |
| 8,145,261 | B2 | 3/2012 | Wang et al. | |
| 8,152,062 | B2 * | 4/2012 | Perrier | B62B 3/1416 235/383 |
| 8,902,609 | B2 * | 12/2014 | Duan | G06K 13/0831 361/727 |
| 2006/0231619 | A1 * | 10/2006 | Lee | G06K 13/08 235/441 |
| 2013/0237086 | A1 | 9/2013 | Chang et al. | |

* cited by examiner

*Primary Examiner* — Anthony Q Edwards
(74) *Attorney, Agent, or Firm* — Birch, Stewart, Kolasch & Birch, LLP

(57) ABSTRACT

A casing and an electronic device using the same are provided. The casing includes a housing, a cover and a connection element. The housing has an opening. The cover selectively covers or exposes the opening and includes a release portion. The release portion is for releasing a component located within the housing. The connection element connects the cover and the housing.

19 Claims, 7 Drawing Sheets

CASING AND ELECTRONIC DEVICE USING THE SAME

TECHNICAL FIELD

The disclosure relates in general to a casing and an electronic device using the same, and more particularly to a casing with a cover and an electronic device using the same.

BACKGROUND

Conventional casing has many components disposed therein. Some of the components are fixed within the casing but some can be removed from the casing. In general, the components located within the casing can be removed through the opening of the casing. Normally, a tool is required for removing components from the casing. The tool is not necessarily available in the vicinity of the casing. Therefore, how to remove the component from the casing will become a trouble to the user if a suitable tool is not available immediately.

Therefore, how to resolve the above problems has become a prominent task for industries in the technology field.

SUMMARY

The disclosure is directed to a casing and an electronic device using the same. The cover of the casing may be used as a tool for removing a component from the casing.

According to one embodiment, a casing is provided. The casing includes a housing, a cover and a connection element. The housing has an opening. The cover selectively covers or exposes the opening and includes a release portion. The release portion is for releasing a component located within the housing. The connection element connects the cover and the housing.

According to another embodiment, an electronic device is provided. The electronic device includes a connector and a casing. The casing includes a housing, a cover and a connection element. The housing has an opening. The cover selectively covers or exposes the opening and includes a release portion. The release portion is for releasing a component located within the connector. The connection element connects the cover and the housing.

The above and other aspects of the invention will become better understood with regard to the following detailed description of the preferred but non-limiting embodiment(s). The following description is made with reference to the accompanying drawings.

Figure 1A:
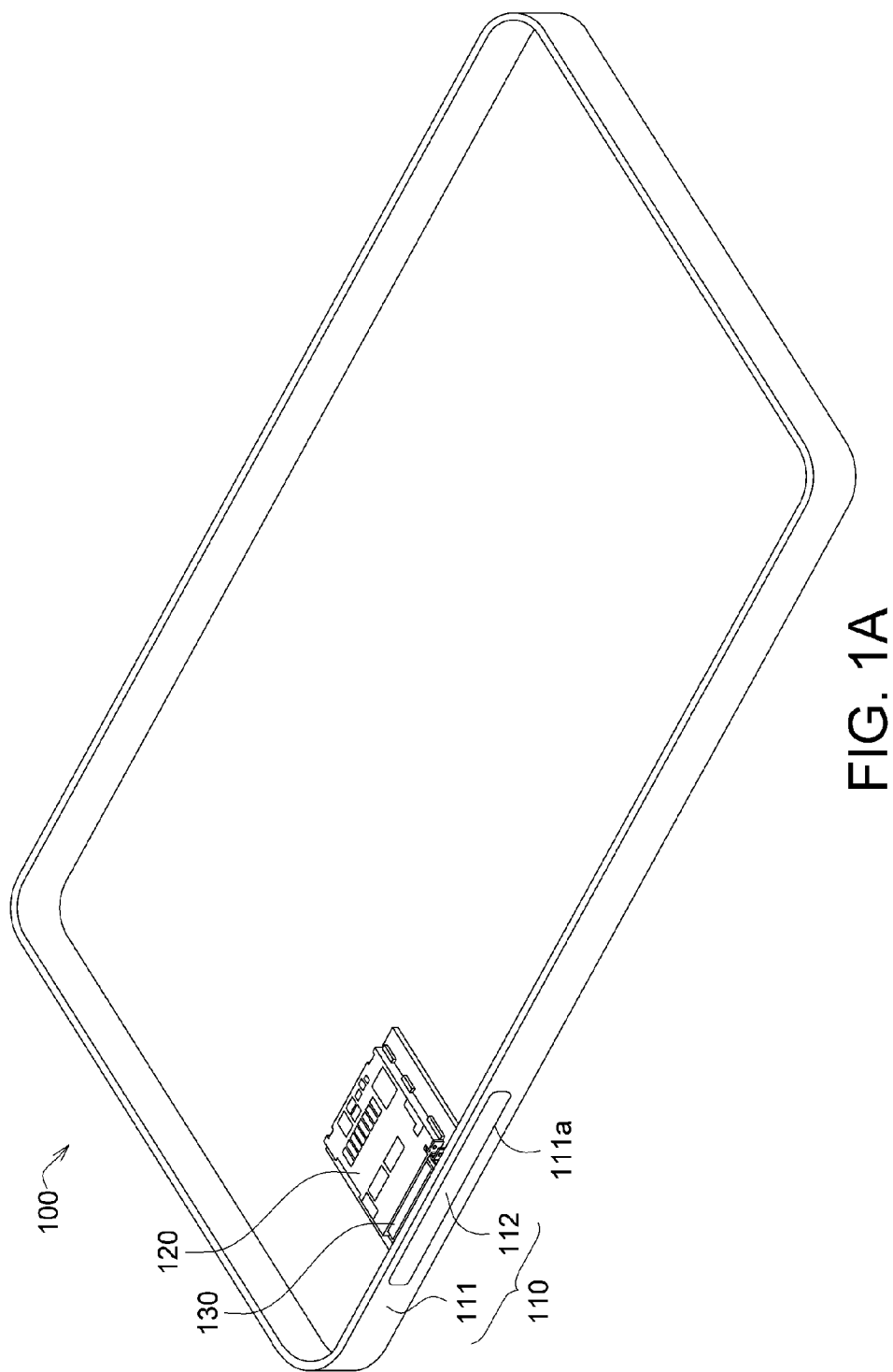
FIG. 1A is an appearance diagram of an electronic device viewed from a view-angle according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1B:
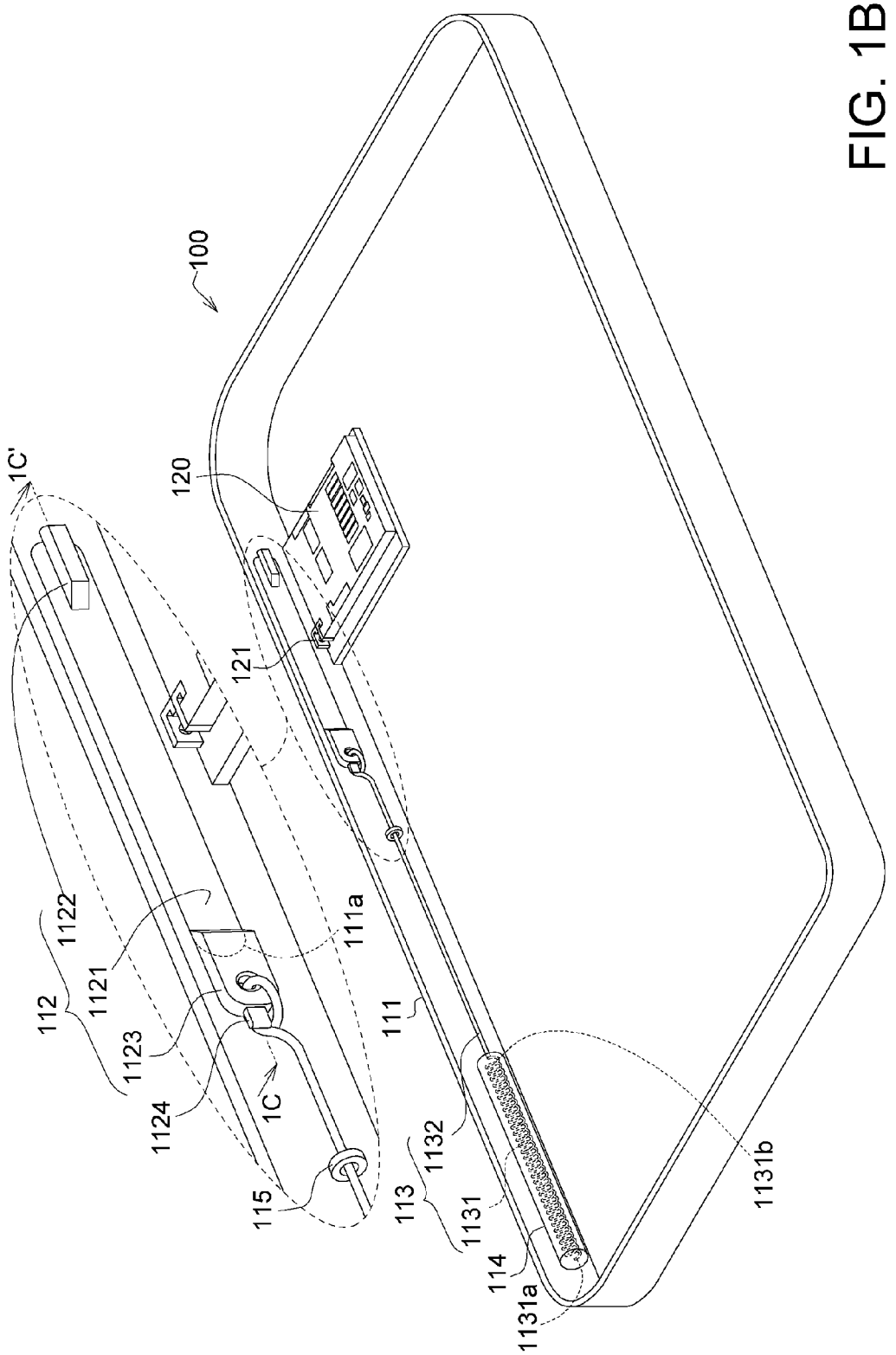
FIG. 1B is an appearance diagram of the electronic device of FIG. 1A viewed from another view-angle.
Figure 1C:
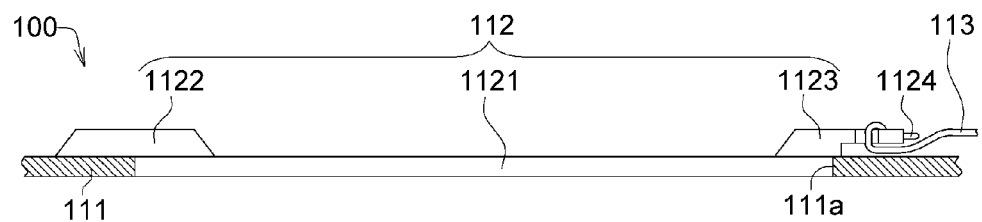
FIG. 1C is a cross-sectional view of the electronic device of FIG. 1A along direction 1C-1C'.
Figure 1D:
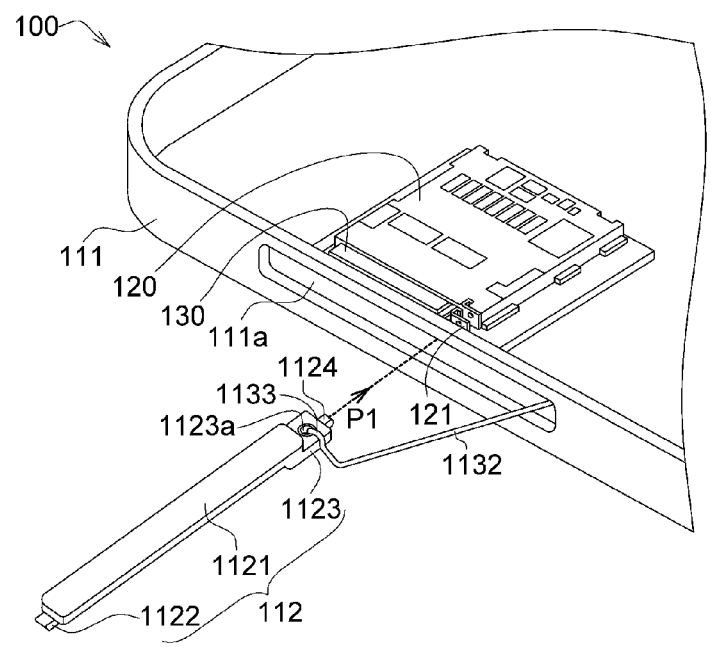
FIG. 1D is a schematic diagram of the cover of FIG. 1A exposing an opening.
Figure 1E:
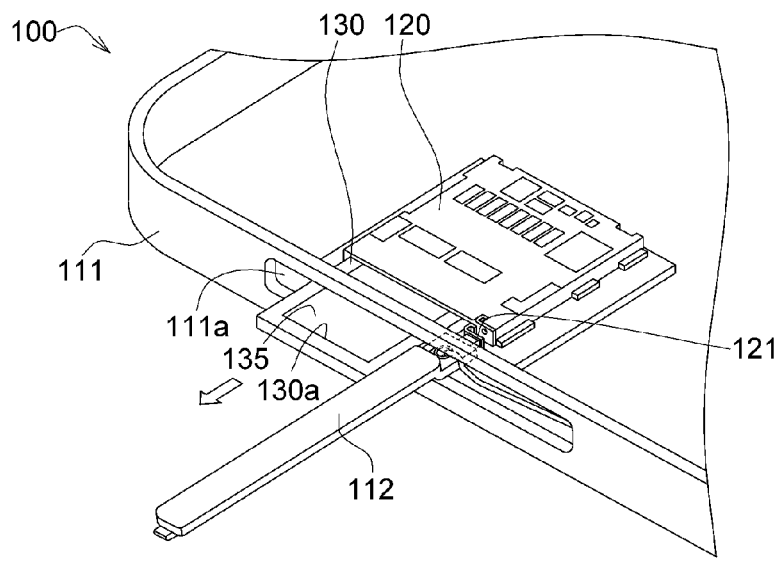
FIG. 1E is a schematic diagram of a component of FIG. 1D removed from a connector.

Refer to FIGS. 1A~1E. FIG. 1A is an appearance diagram of an electronic device viewed from a view-angle according to an embodiment of the disclosure. FIG. 1B is an appearance diagram of the electronic device of FIG. 1A viewed from another view-angle. FIG. 1C is a cross-sectional view of the electronic device of FIG. 1A along direction 1C-1C'. FIG. 1D is a schematic diagram of the cover of FIG. 1A exposing an opening. FIG. 1E is a schematic diagram of a component of FIG. 1D being removed from a connector.

The electronic device 100 can be realized by a portable electronic device, such as mobile phone, laptop, tablet PC, video capturing device or other electronic device with portability function.

The electronic device 100 includes a casing 110 and a connector 120. The connector 120 is capable of accommodating a component 130 (illustrated in FIG. 1D). The component 130, such as a tray, has a recess 130a (illustrated in FIG. 1E) for accommodating the component 135. The component 135 can be realized by an E-card, such as subscriber identity module (SIM) card, memory card, other types of E-card or other non-card component. After the component 135 is accommodated in the recess 130a, and the component 130 inserts the component 135 into the connector 120 such that the component 135 is electrically connected to the connector 120. In another embodiment, the component 130 is not used, and the component 135 can be directly inserted into the connector 120.

As indicated in FIGS. 1A and 1B, the casing 110 includes a housing 111, the cover 112, a connection element 113 and a limiting member 114. The housing 111 has an opening 111a. The cover 112 can selectively cover or expose the opening 111a. For example, the cover 112 of FIG. 1A covers the opening 111a, while the cover 112 of FIG. 1D exposes the opening 111a.

As indicated in FIG. 10, the cover 112 includes a covering plate 1121, a first leaning portion 1122 and a second leaning portion 1123. The first leaning portion 1122 and the second leaning portion 1123 are respectively disposed at two opposite ends of the covering plate 1121 and form two ends of the cover 112. When the cover 112 covers the opening 111a, the covering plate 1121 is located within the opening 111a to cover the opening 111a, and the first leaning portion 1122 and the second leaning portion 1123 are located within the housing 111 and lean on inner sides of the housing 111. Since the first leaning portion 1122 and the second leaning portion 1123 lean on an inner sides of the housing 111, the cover 112 will not come off the opening 111a easily. Besides, at least one of the first leaning portion 1122 and the second leaning portion 1123 can have flexibility or elasticity, such that when the cover 112 covers the opening 111a, the first leaning portion 1122 and/or the second leaning portion 1123 can be deformed and can be easily inserted into or removed from the housing 111.

As indicated in FIGS. 1B and 1C, the second leaning portion 1123 of the cover 112 includes a release portion 1124. The release portion 1124 is a protruding portion, and the cross-section of the terminal portion of the protruding portion can be a semi-circular cross-section, a rectangular cross-section, an oval cross-section, a squared cross-section or other shapes of cross-section. In the present embodiment, the connector 120 includes a removing pin 121, and the release portion 1124 activates the removing pin 121 to release the component 130 located within the connector 120. Detailed descriptions are disclosed below with accompanying drawings FIGS. 1D and 1E.

As indicated in FIGS. 1D and 1E, the cover 112 can come off the opening 111a. The connection element 113 is connected to the cover 112. The connection element 113 has flexibility and/or elasticity, such that the cover 112, after coming off the opening 111a, can have a larger room of movement and can be separated from the opening 111a with a sufficient distance. Thus, the cover 112 can extend in a direction basically perpendicular to the removing pin 121, and the release portion 1124 can activate the removing pin 121 via the opening 111a along a path P1 basically perpendicular to the removing pin 121 to remove the component 130 from the connector 120 as indicated in FIG. 1E. That is, the cover 112 can be used as a tool for removing the component 130. The connection element 113 is connected to the cover 112. Therefore, when the user wants to remove the component 130, the user does not need to look for tool, and the cover 112 does not come off easily.

As indicated in FIG. 1B, the connection element 113 connects the cover 112 and the housing 111. The connection element 113 has flexibility and/or elasticity. For example, the connection element 113 includes an elastic element 1131 and a connection wire 1132. The elastic element 1131 provides elasticity and/or flexibility to the connection element 113. The connection wire 1132 connects the elastic element 1131 and the cover 112. For example, the elastic element 1131 includes a first end 1131a and a second end 1131b, wherein the first end 1131a of the elastic element 1131 is connected to the housing 111 or the limiting member 114, and the connection wire 1132 connects the second end 1131b of the elastic element 1131 and the cover 112.

In an embodiment, it does not matter whether the connection wire 1132 have flexibility or not. In terms of material, the connection wire 1132 can be formed of plastics, metal, rubber, nylon or a combination thereof. Additionally, the elastic element 1131 can be realized by a spring or an elastic rubber, wherein the spring is a compression spring, for example. In another embodiment, the connection element 113 can dispense with the connection wire 1132. According to such design, the entire connection element 113 can be realized by an elastic element (such as elastic element 1131), and can directly connect the cover 112 to the housing 111 or directly connect the cover 112 to the limiting member 114.

As indicated in FIG. 1B, the limiting member 114 is fixed to the housing 111. The position or displacement of the elastic element 1131 is limited by the limiting member 114, such that during the deformation process (for example, when the elastic element 1131 moves the cover 112), the elastic element 1131 will not wobble or interfere with other component within the housing 111. Also, the limiting member 114 can have a cylindrical shape, and at least a part of the elastic element 1131 can be located within the limiting member 114. Or, the limiting member 114 can be a closed ring or an open ring allowing the elastic element 1131 to pass through.

As indicated in FIG. 1B, the casing 110 may further include a limiting ring 115 disposed on the housing 111. The connection element 113 can pass through the limiting ring 115, For example, the connection wire 1132 of the connection element 113 passes through the limiting ring 115. Thus, the position or displacement of the connection element 113 is limited by the limiting ring 115 such that the connection element 113 will not wobble too badly. In another embodiment, the quantity of the limiting ring 115 of the casing 110 can be pleural. Or, the casing 110 can dispense with the limiting ring 115.

Moreover, each of the connection element 113 and the cover 112 includes a connecting portion through which the connection element 113 and the cover 112 are interconnected. As indicated in FIG. 1D, one end of the connection wire 1132 of the connection element 113 has a first connecting portion 1133, while the second leaning portion 1123 of the cover 112 has a second connecting portion 1123a. The connection element 113 can be firmly connected to the second connecting portion 1123a through the first connecting portion 1133 such that the cover 112 will not come off easily and become missing. In the present embodiment, the first connecting portion 1133 is a loop knot, and the second connecting portion 1123a is a connection hole. The first connecting portion 1133 passes through the second connecting portion 1123a and is fixed to the second leaning portion 1123 to be firmly connected to the cover 112. In another embodiment, the first connecting portion 1133 can be a hook engaged with the second connecting portion 1123a to be firmly connected to the cover 112. Furthermore, the first connecting portion 1133 and the second connecting portion 1123a can be inter connected in a movable manner or can be fixed to each other (cannot move with respect to each other).

Figure 2A:
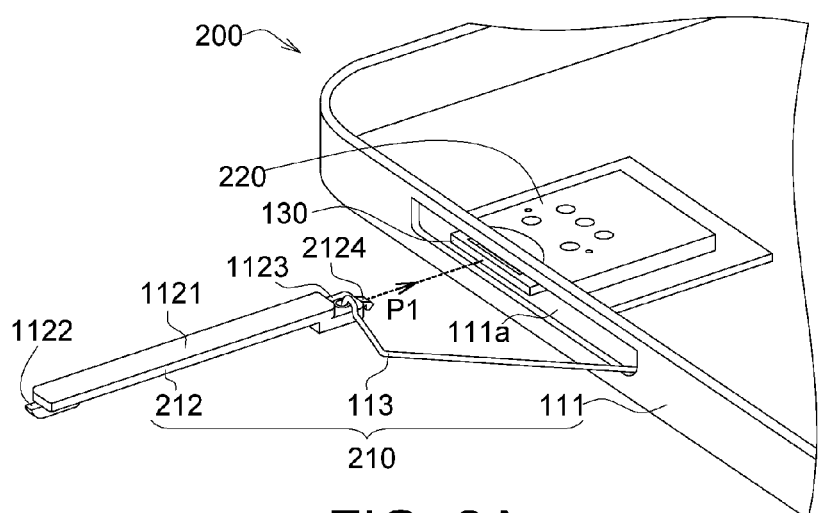
FIG. 2A is an appearance diagram of an electronic device according to another embodiment of the disclosure.
Figure 2B:
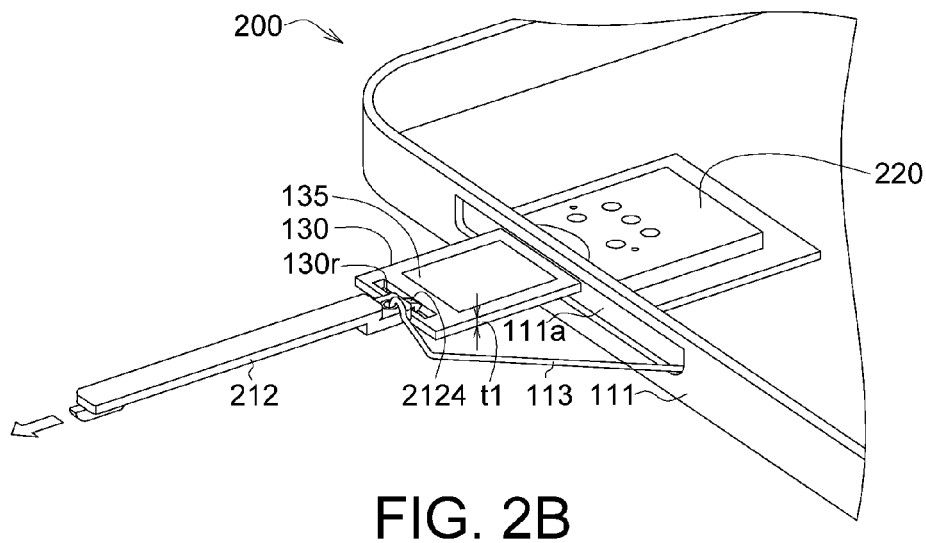
FIG. 2B is a schematic diagram of a ticking component of the cover of FIG. 2A.

Refer to FIGS. 2A and 2B. FIG. 2A is an appearance diagram of an electronic device according to another embodiment of the disclosure. FIG. 2B is a schematic diagram of a ticking component of the cover of FIG. 2A. The electronic device 200 includes a casing 210 and a connector 220. The casing 210 includes a housing 111, a cover 212, a connection element 113, a limiting member 114 (not illustrated) and a limiting ring 115 (not illustrated). The housing 111 has an opening 111a. The cover 212 can selectively cover or expose the opening 111a.

In the present embodiment, the connector 220 is a pushpull connector, and the release portion 2124 of the cover 212 is a hook for catching on the component 130 from the connector 220. As indicated in FIG. 2A, when the cover 212 exposes the opening 111a, the connection element 113 has flexibility such that the cover 212 can have a larger room of movement and can be separated from the opening 111a with a sufficient distance. Thus, the cover 212 can extend in a direction basically perpendicular to the component 130, such that the cover 212 can catch on the component 130 via the opening 111a along a path P1 basically perpendicular to the component 130. As indicated in FIG. 2B, the component 130 has a slot 130r. When the cover 212 enters the housing 111 via the opening 111a, the release portion 2124 of the cover 212 can enter the slot 130r of the component 130 to catch on and remove the component 130 from the connector 220 and make the component 130 completely come off the connector 220.

Like the electronic device 100 disclosed above, the cover 212 of the electronic device 200 of the present embodiment is connected to the housing 111 by the connection element 113. Therefore, when the user wants to remove the component 130, the user does not need to look for tool, and the cover 212 does not come off easily.

Figure 3A:
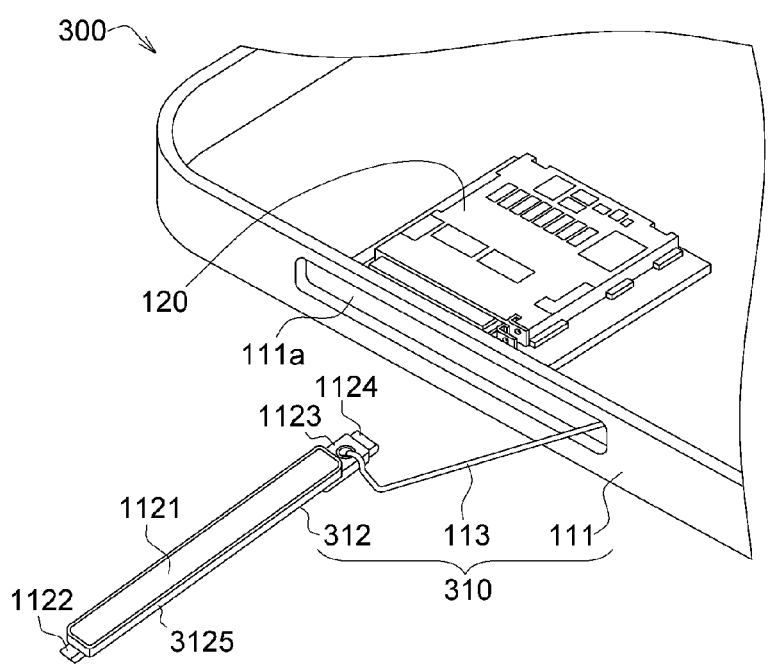
FIG. 3A is an appearance diagram of an electronic device according to another embodiment of the disclosure.
Figure 3B:
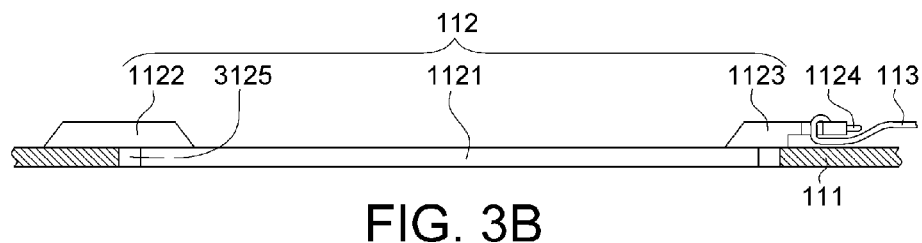
FIG. 3B is a cross-sectional view of the cover of FIG. 3A.

Refer to FIGS. 3A and 3B. FIG. 3A is an appearance diagram of an electronic device according to another embodiment of the disclosure. FIG. 3B is a cross-sectional view of the cover of FIG. 3A. The electronic device 300 includes a casing 310 and a connector 120. The casing 310 includes a housing 111, a cover 312, a connection element 113, a limiting member 114 (not illustrated) and a limiting ring 115 (not illustrated). The housing 111 has an opening 111a, and the cover 312 can selectively cover or expose the opening 111a.

In the present embodiment, the cover 312 includes a covering plate 1121, a first leaning portion 1122, a second leaning portion 1123 and a sealing gasket 3125. The sealing gasket surrounds the covering plate 1121. When the cover 312 covers the opening 111a, the sealing gasket 3125 is engaged between an inner sidewall of the opening 111a and the covering plate 1121 such that the cover 312 will not come off the housing 111 easily and/or liquid will not infiltrate the housing 111. In an embodiment, the sealing gasket 3125 can be formed of a compressible material such as plastics or rubber.

In the above embodiment the release portion is exemplified by a protruding portion or a hook. However, in other embodiment, the release portion can be realized by other structure, and details are disclosed below with accompanying drawing FIG. 4.

Figure 4:
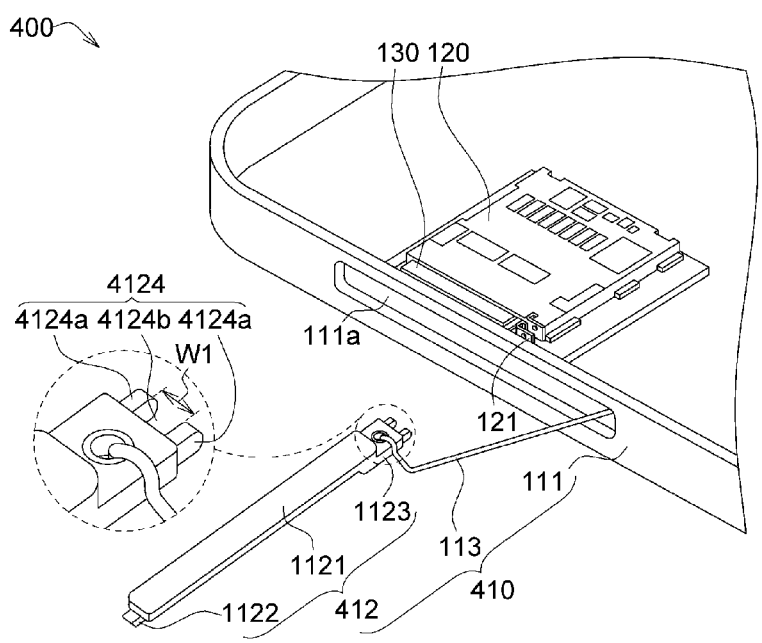
FIG. 4 is an appearance diagram of an electronic device according to another embodiment of the disclosure.

Referring to FIG. 4, an appearance diagram of an electronic device according to another embodiment of the disclosure is shown. The electronic device 400 includes a casing 410 and a connector 120. The casing 410 includes a housing 111, a cover 412, a connection element 113, a limiting member 114 (not illustrated) and a limiting ring 115 (not illustrated). The housing 111 has an opening 111a, and the cover 312 can selectively cover or expose the opening 111a.

The cover 412 includes a covering plate 1121, a first leaning portion 1122 and a second leaning portion 1123. The second leaning portion 1123 includes a release portion 4124. Unlike the release portion of the above embodiment, the release portion 4124 of the present embodiment includes two protruding portions 4124a and an indent 4124 formed between the two protruding portions 4124a. The indent 4124b has a width W1 substantially equivalent to or greater than a thickness t1 of the component 130 (thickness t1 is illustrated in FIG. 2B), such that the component 130 can enter the indent 4124b and become limited by the indent 4124b. Thus, during the process of pushing the component 130 to the connector 120, the component 130 will not come off the release portion 4124 easily, and the component 130 can be pushed stably. In another embodiment, a width W1 of the indent 4124b can be smaller than a thickness t1 of the component 130, such that the component 130 can be engaged in the indent 4124b, and the release portion 4124 can push the component 130 in the indent 4124b or pull the component 130 from the indent 4124b.

Figure 5A:
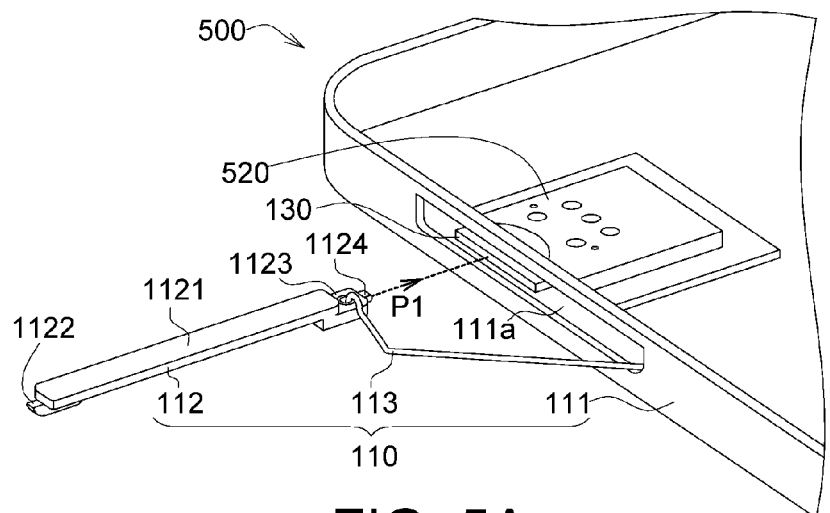
FIG. 5A is an appearance diagram of an electronic device according to another embodiment of the disclosure.
Figure 5B:
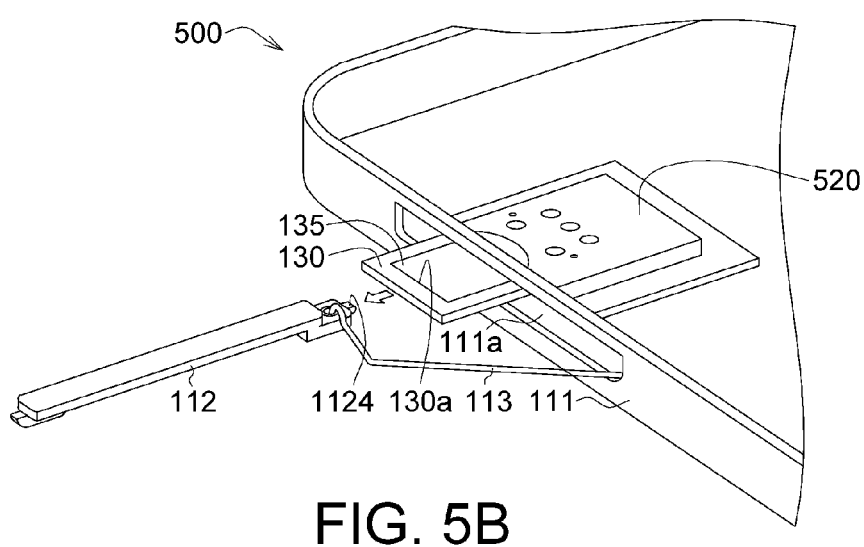
FIG. 5B is a schematic diagram of a ticking component of the cover of FIG. 5A.

Refer to FIGS. 5A and 5B. FIG. 5A is an appearance diagram of an electronic device according to another embodiment of the disclosure. FIG. 5B is a schematic diagram of a ticking component of the cover of FIG. 5A. The electronic device 500 includes a casing 110 and the connector 520. The casing 110 includes a housing 111, a cover 112, a connection element 113, a limiting member 114 (not illustrated) and a limiting ring 115 (not illustrated). The housing 111 has an opening 111a. The cover 112 can selectively cover or expose the opening 111a.

In the present embodiment, the connector 520 can be realized by a push-push connector. The release portion 1124 of the cover 112 can press the component 130 via the opening 111a to remove the component 130 and the component 135 disposed within the recess 130a from the connector 520. When the component 130 needs to be inserted into the connector 520, the release portion 1124 can push the component 130 into the connector 520 and make the component 135 become electrically connected to the connector 520. In another embodiment, the cover 112 can directly push the component 135 into the connector 520 without using the component 130. In other embodiment, the release portion 1124 of FIG. 5A can be replaced by the release portion 2124 or 4124 disclosed above.

To summarize, when the connector includes a removing pin or the connector is a push-push connector, the release portion with a hook, a protruding portion and/or an indent can be used to remove the component 130 and/or 135 from the connector and/or push the component 130 and/or 135 into the connector. When the connector is a push-pull connector, the release portion with a hook can be used to remove the component 130 and/or 135 from the connector and/or push the component 130 and/or 135 into the connector. Thus, the cover with a release portion can be used as a tool for releasing the component from the connector or pushing the component into the connector. Since the cover goes with the casing, there is no need to look for other tools when the user wants to remove the component.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A casing, comprising:
  a housing having an opening;
  a cover selectively covering or exposing the opening, wherein the cover comprises a release portion for releasing a component located within the housing; and
  a connection element connecting the cover and the housing;
  wherein the cover comprising:
    a covering plate; and
    a sealing gasket surrounding the covering plate;
  wherein when the cover covers the opening, and the sealing gasket is engaged between an inner sidewall of the opening and the covering plate.

2. The casing according to claim 1, wherein the connection element comprises a first connecting portion, the cover comprises a second connecting portion, and the connection element is connected to the second connecting portion through the first connecting portion.

3. The casing according to claim 1, wherein the connection element comprises:
  an elastic element comprising a first end fixed to the housing.

4. The casing according to claim 3, wherein the connection element comprises:
  a connection wire connecting a second end of the elastic element and the cover.

5. The casing according to claim 3, further comprising:
  a limiting member fixed to the housing;

wherein, the elastic element is located within the limiting member and connects the limiting member and the cover.

6. The casing according to claim 1, wherein the component is inserted into a connector, and the release portion is a protruding portion for activating a removing pin of the connector to remove the component from the connector.

7. The casing according to claim 1, wherein the component is inserted into a push-push connector, and the release portion is a protruding portion for pressing the component to remove the component from the push-push connector.

8. The casing according to claim 1, wherein the component is inserted into a push-pull connector, and the release portion is a hook for catching on the component from the push-pull connector.

9. The casing according to claim 1, wherein the release portion comprises an indent, and a width of the indent is substantially equivalent to or greater than a thickness of the component.

10. An electronic device, comprising:
   a connector; and
   a casing, comprising:
      a housing having an opening;
      a cover selectively covering or exposing the opening, wherein the cover comprises a release portion for releasing a component located within the connector; and
      a connection element connecting the cover and the housing;
   wherein the cover comprising:
      a covering plate; and
      a sealing gasket surrounding the covering plate;
   wherein when the cover covers the opening, and the sealing gasket is engaged between an inner sidewall of the opening and the covering plate.

11. The electronic device according to claim 10, wherein the connection element comprises a first connecting portion, the cover comprises a second connecting portion, and the connection element is connected to the second connecting portion through the first connecting portion.

12. The electronic device according to claim 10, wherein the connection element comprises:
   an elastic element comprising a first end fixed to the housing.

13. The electronic device according to claim 12, wherein the connection element comprises:
   a connection wire connecting a second end of the elastic element and the cover.

14. The electronic device according to claim 12, further comprising:
   a limiting member fixed to the housing;
   wherein the elastic element is located within the limiting member and connects the limiting member and the cover.

15. The electronic device according to claim 10, wherein the component is inserted into a connector, and the release portion is a protruding portion for activating a removing pin of the connector to remove the component from the connector.

16. The electronic device according to claim 10, wherein the component is inserted into a push-push connector, and the release portion is a protruding portion for pressing the component to remove the component from the push-push connector.

17. The electronic device according to claim 10, wherein the component is inserted into a push-pull connector, and the release portion is a hook for catching on the component from the push-pull connector.

18. The electronic device according to claim 10, wherein the component is an E-card or a tray.

19. The electronic device, according to claim 18, wherein the E-card is a subscriber identity module (SIM) card or a memory card.

* * * * *